United States Patent [19]

Stein

[11] Patent Number: 4,850,120

[45] Date of Patent: Jul. 25, 1989

[54] POPCORN WARMING APPARATUS

[75] Inventor: Andrew M. Stein, Massapequa Park, N.Y.

[73] Assignee: Six Corners Development Company, Amityville, N.Y.

[21] Appl. No.: 133,754

[22] Filed: Dec. 16, 1987

[51] Int. Cl.$^4$ ............................................. F26B 19/00
[52] U.S. Cl. ......................................... 34/88; 99/474; 219/214; 312/236
[58] Field of Search ............... 126/21 A, 37 R, 37 A, 126/261, 265; 34/88, 196, 197, 212, 215; 312/236, 114; 219/214, 218, 369, 370, 374, 385, 400; 99/323.5, 323.7, 323.8, 323.9, 474, 475, 447, 448

[56] References Cited

U.S. PATENT DOCUMENTS

| | | | |
|---|---|---|---|
| 1,218,341 | 3/1917 | Truitt | 219/400 |
| 2,458,190 | 1/1949 | Newburger | 219/214 |
| 2,529,877 | 11/1950 | Ladge | 34/88 |
| 2,575,643 | 11/1951 | Tamsen | 34/88 |
| 4,426,923 | 1/1984 | Ohata | 126/21 A |

Primary Examiner—Noah P. Kamen
Attorney, Agent, or Firm—Pennie & Edmonds

[57] ABSTRACT

A food storage and warming apparatus comprising a first compartment for holding an amount of bulk food at a predetermined temperature above room temperature; a second compartment for holding a plurality of individualized food portions; an air heating device for warming the first compartment; a heat transfer plate having apertures which allow heated air to flow from the first compartment to the second compartment for warming thereof; and means for returning heated air from the second compartment to the first compartment to recycle the heated air, thus conserving energy.

25 Claims, 4 Drawing Sheets

POPCORN WARMING APPARATUS

FIELD OF THE INVENTION

The present invention relates to an apparatus for storing bulk food, such as popcorn, as well as a plurality of serving portions of such food at a predetermined temperature until the portions are served to a customer.

BACKGROUND ART

Prior to the present invention there were available various apparatus for attempting to keep food, such as popcorn, warm, such apparatus generally consisting of a bin enclosed in a housing which was provided with heat, a glass front panel so that the customers could view the food, and a door for accessing the food in the bin. After popping, the popcorn remained in the bin until a customer requested an order, whereupon the counter attendant would open the bin door, fill a container with popcorn and serve the popcorn to the customer.

Many disadvantages of such prior art apparatus have been tolerated for years. For example, it was very time consuming for the attendant to open the bin and fill a container of popcorn for a customer. When a large number of customers are waiting to be served, this time delay would result in a loss of sales.

Popcorn warming apparatus are generally used at entertainment arenas, such as movie theaters and sports stadiums. At such entertainment arenas there are intermissions or other pauses between events during which a large crowd forms at the food counter. If the attendant wished to prefill the popcorn containers he encountered several problems. If the attendant left the filled containers on the counter top the popcorn became cold. If the attendant placed the filled containers in the bin on top of the bulk popcorn it was very unsightly for the prospective customers, the containers were susceptible to spillage as they were not a flat surface, the outside of the container usually is printed upon and thus should not contact the food directly, there was a limited amount of space in the bin for such filled containers, and it prevented a second attendant from filling more containers until the filled containers were all served.

Another disadvantage of opening and closing the bin door for each container of popcorn was that a great amount of heat was allowed to escape from the bin, thereby cooling off the popcorn and resulting in cold popcorn as well as in higher energy costs to try to maintain the desired temperature.

Further, as the attendant was hurriedly filling each container, the amounts served to each customer varied greatly. This problem leads to customer dissatisfaction and difficulty in keeping inventory at a proper level.

Yet another disadvantage of the prior art apparatus was that the warm popcorn was served in cold containers, thus causing the popcorn to rapidly cool to a less palatable state than if it would be kept at or near its popping temperature.

Accordingly, the present invention provides a simple solution to these problems in a heretofore unknown manner, so as to improve the efficiency of serving popcorn as well as to improve palatability of the popped corn itself.

SUMMARY OF THE INVENTION

The present invention relates to an improved apparatus for storing food, such as popcorn, and keeping the food warm prior to being served to a customer. The popcorn warming apparatus of the present invention includes a housing means, a popcorn bin inside the housing means, heating means, a popcorn bin door, all somewhat similar to the aforementioned prior art apparatus, and further includes a perforated bin top panel on top of which is disposed a filled popcorn container bin which includes one or more flat trays and one or more doors. The front and rear panels of the popcorn container bin are preferably made of transparent plastic or glass, and the flat trays are preferably either less wide or deep than the popcorn container bin or are perforated, so as to allow hot air to circulate. The heating means of the present invention may either be located in the housing means outside the popcorn bin, inside the popcorn bin, inside the popcorn container bin or in any combination of the aforementioned, and may include an air circulating means.

It is an object of the present invention to greatly facilitate the fast, efficient serving of warm food, such as popcorn, by a food counter attendant, particularly during busy periods.

Another object of the invention is to effectively enable a food counter attendant to serve popcorn which is warmer than the popcorn served from the prior art apparatus in that the popcorn container is also warm and less heat escapes from the popcorn bin during the serving of the popcorn.

A further object of the present invention is to eliminate the need for a food counter attendant to store filled popcorn containers on top of the bulk popcorn in the popcorn bin.

Another object of the present invention is to reduce to energy consumption used for heating popcorn in that the popcorn bin need not be opened as frequently and the total time which the popcorn bin is open is reduced.

Yet another object of the present invention is to allow a food counter attendant to fill large numbers of popcorn containers during periods when there are no customers, thereby allowing the attendant to be less hurried and more methodical resulting in evenly filled popcorn containers.

BRIEF DESCRIPTION OF THE DRAWINGS

Preferred embodiment of the invention are described hereinbelow with reference to the drawing figures, wherein.

DETAILED DESCRIPTION OF THE PREFERRED EMBODIMENTS

Figure 1:
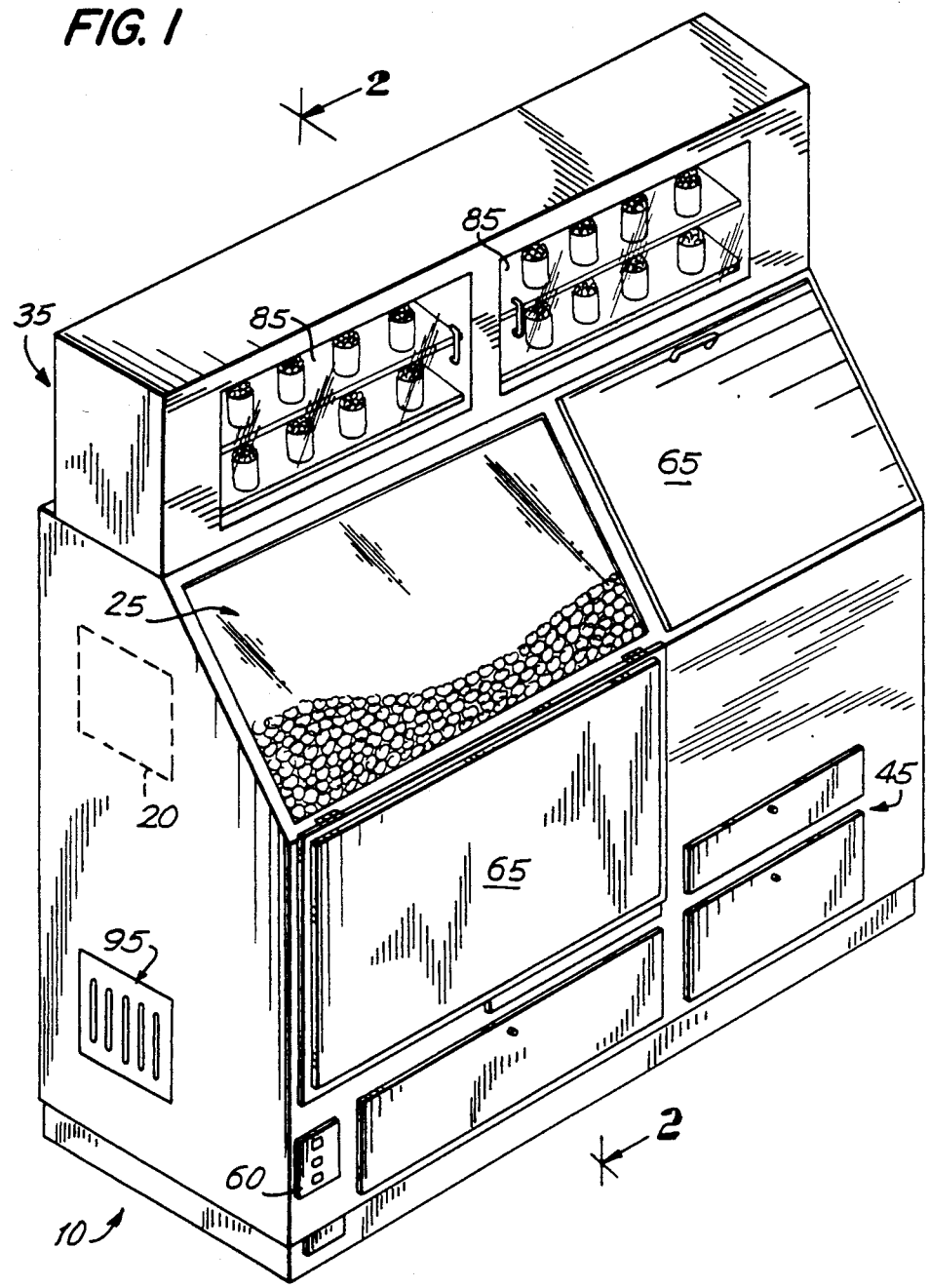
FIG. 1 is a perspective view of a popcorn warming apparatus according to the invention.
Figure 2:
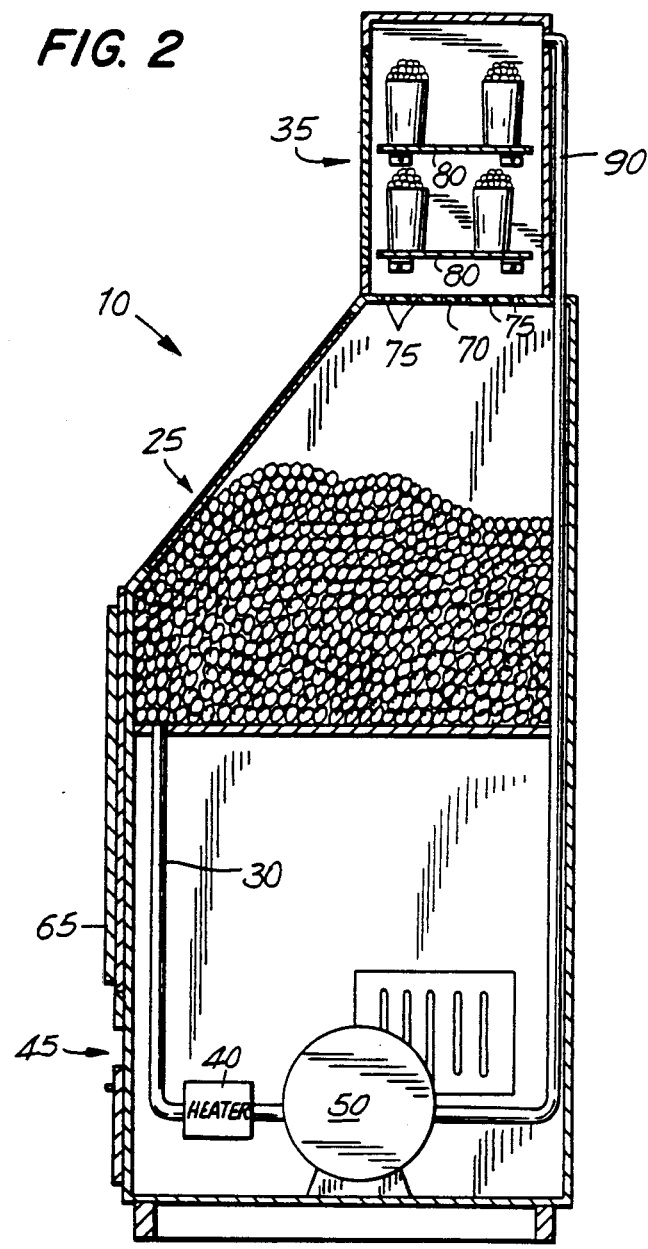
FIG. 2 is a cross-sectional view of the apparatus of FIG. 1 taken along lines 2—2.

Referring now to FIGS. 1 and 2, there is illustrated a popcorn warming apparatus 10 according to the invention. This apparatus houses three separate sections in a single unit: a bulk food holding section 25, a section for holding individualized serving portions of food 35; and a utility storage section for housing the electrical components 45. For convenience of manufacture, the bulk food storage section 25 and utility storage section 45 are combined to form a lower compartment of the apparatus 10, while the serving portion section 35 forms a separate upper compartment of the apparatus 10. To facilitate serving of the food from the bulk storage into the individualized portions, sections 25, 45 are situated for ease of access by the counter person or operator.

A food such as popped corn is maintained at a predetermined temperature in the bulk food storage section 25. When popcorn is utilized as the bulk food, the apparatus 10 may include popping means within the bulk food storage section 25. Preferably, however, the popping means is located in an adjacent apparatus, whereby the corn is popped before being introduced into the bulk food storage section 25 such as by a chute or filling hole 20 indicated in phantom in FIG. 1.

The bulk food storage section 25 is warmed by introducing heated air from a pipe 30, the end of which includes a diffuser or other air distributing means. For example, a pipe or tube running the length of the cabinet and having a plurality of holes can be used to introduce the warm air into the bulk food storage section 25. The air is warmed by an inline heater 40 located upstream of the diffuser, the heater including a plurality of wires or heating coils through which electrical current passes, thus causing the wires to heat and warm the air in a manner well known to those skilled in the art. Air is forced through heater 40 and pipe 30 by blower 50. The blower 50 and heater 40 are conveniently located in the utility storage section 45, a lower portion of which includes vent 55 for cooling of the electrical components.

For convenience in tailoring the operation of the unit to the demands of food service, the heater 40 may be of the type that can provide different levels of heat, such levels being selectable by control means 60 located on the exterior of the apparatus. Thus, when initially turning on the unit, a higher heat level can be used to quickly warm the bulk food storage section 25. After, the desired temperature is reached, the heating level can be automatically or manually reduced to a lower value.

This heating control can also be utilized with a thermostat 5 for intermittently operating the blower 50. This enables energy conservation in that the blower 50 does not have to be continuously operated, and the heating control can be designed to automatically achieve the higher heating level when the blower is operating so as to further reduce the time of operation of the blower 50.

An upper portion of the bulk food storage section 25 forms a lower portion of the serving section 35. As shown in the FIGS., a common wall 70 is provided between these sections. In order to allow heated air in section 25 to be introduced into section 35, a plurality of vents 75 in the form of holes are provided in wall 70. Preferably, this wall may be a perforated metal plate or screen. Warm air thus enters section 35 for warming the individual food containers. Although the FIGS. show each container filled with popcorn, it is possible to use part of section 35 to hold empty popcorn containers, thus also heating them to the desired temperature. By this procedure, an operator can then fill the warmed empty containers with the warmed popcorn and thereafter place the filled containers back into the storage section 35. Thus, a number of containers can be filled in this manner and maintained heated and ready for dispensing to a customer. Also, as one operator dispenses filled containers, another operator can be filling empty containers with the heated popped corn, so that a large number of customers can be rapidly and efficiently served.

The filled containers are preferably maintained on shelves 80. Heated air is allowed to circulate in upper section 35 by providing space between the end of the shelves 80 and the walls. Alternately, as shown in FIG. 3, shelves of a perforated material, such as wire shelving, or shelves having vents 15 to allow air circulation therethrough can also be used.

As the heated air circulates throughout the apparatus, it generally tends to rise. Thus, heated air collects at the upper portion of upper section 35. For optimum efficiency in utilizing the heated air, a return line 90 is installed. This return line 90 enables heated air from the upper section 35 to be recirculated either to blower 50 and through heater 40 back into section 25 or if desired, the air can be directly circulated from section 35 to section 25.

Figure 3:
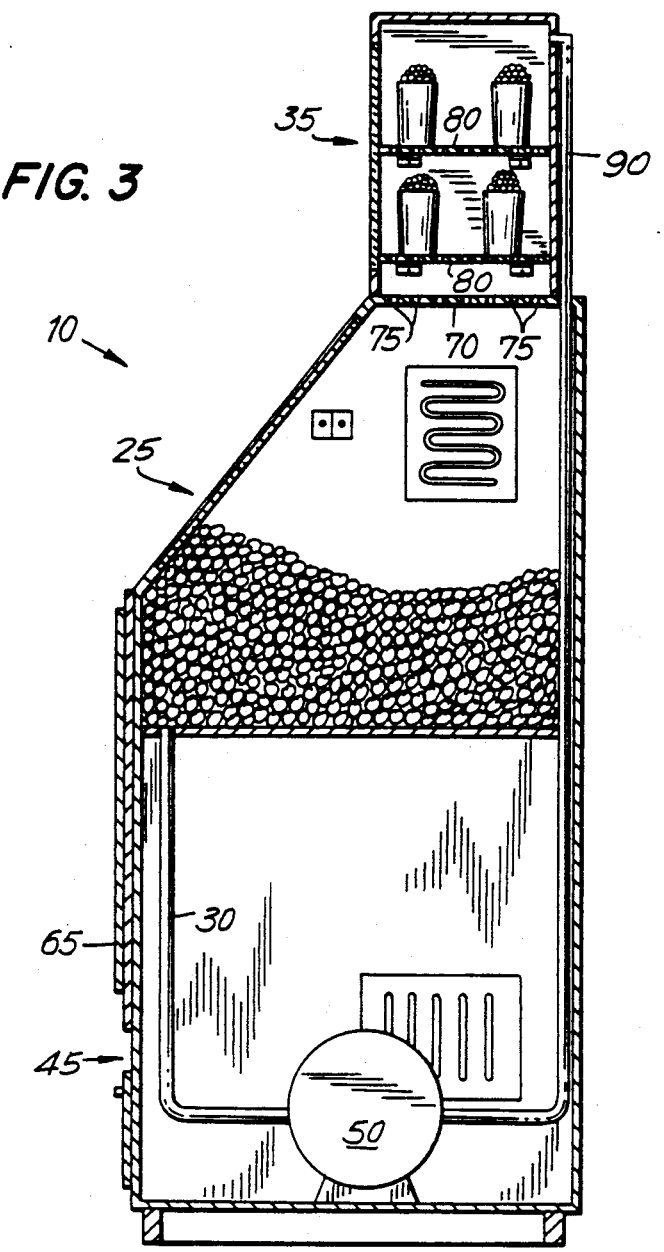
FIGS. 3 and 4 are cross-sectional views of alternate embodiments of the invention taken along lines 2—2 of FIG. 1.
Figure 4:
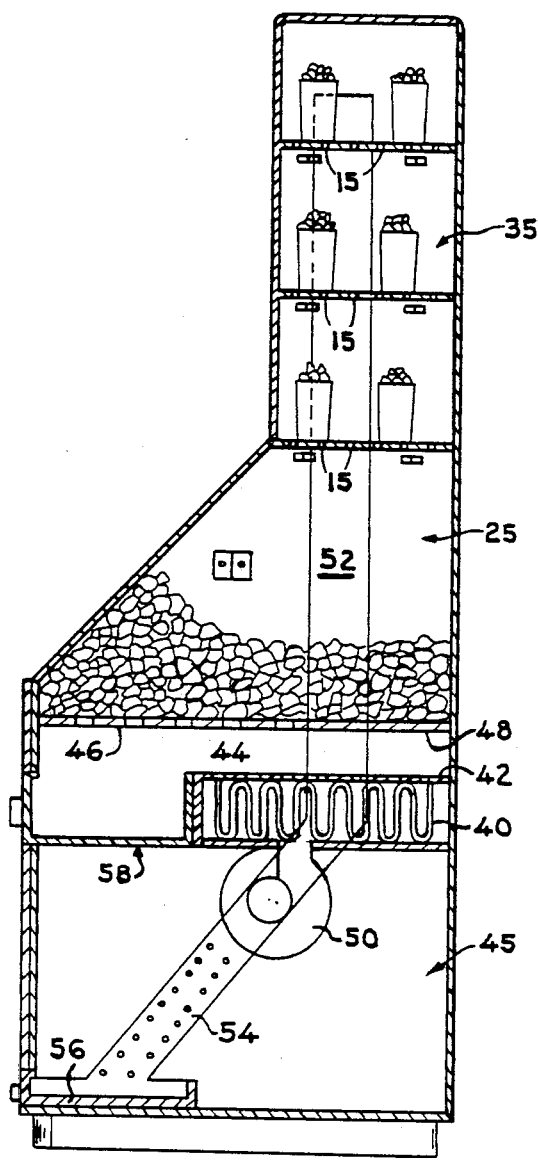

In the embodiments of the invention, shown in FIGS. 3 and 4, components which are the same as those of FIGS. 1 and 2 have the same numerical designation. As illustrated in FIG. 3, the heating unit may be an electric heater 95 mounted on an inner wall of the bulk food storage section 25. There is no need for an inline heater, and the blower 50 can force air through pipe 30 directly into section 25. Again, a return line 90 is used to return heated air from section 35 to section 25, thus reducing the demand on the time of use of the electric heater.

In FIG. 4, blower 50 directs air past heater 40, through perforated cover plate 42 and thereafter through chamber 44 and the perforated section 46 of floor 48. The air then passes upward past the popcorn in compartment 25 and into the individualized serving portion compartment 35. Thereafter, chimney 52 allows return of hot air to the blower 50. If desired, two chimneys can be used, one on each interior sidewall of the unit. The chimney is provided with a perforated return line 54 which serves two functions: it allows excess air to escape into compartment 45 and thereafter out of the unit through vent 55, and it allows particulate matter to fall into lower clean-out drawer 56. Similarly, an upper clean-out drawer 58 is provided for the removal of unpopped kernels and the like.

Access to bulk food storage 25 is provided by doors 65, shown as having a bottom hinge for easy opening for filling with popped corn. Other door designs are possible to reduce or minimize heat loss when opening and closing. Upper section 35 also includes access doors 85, preferably of the side-sliding type for quick access with minimum heat loss. If desired, both compartments can utilize side sliding doors made of glass, metal, wood or other suitable material. Upper section access doors 85 are preferably made of glass or transparent plastic so the operator can easily view how many serving portions are on hand for distribution to customers.

The appropriate electronic wiring and controls are not shown since they are well known to one skilled in the art. The apparatus may be adapted for connection to an AC outlet, or it may be hard wired for more permanent installations.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A food storage, display and warming apparatus comprising:

a first storage compartment for holding an amount of bulk food at a predetermined temperature above room temperature and including means for accessing said bulk food therein;

a second storage and display compartment for holding and displaying a plurality of individualized food portions and including means for viewing and accessing said individualized food portions;

means for warming said first storage compartment;

a common wall member between said first and second compartments and having means for allowing heated air to travel from said first compartment to said second compartment; and a conduit for returning heated air from an upper portion of said second compartment to said first compartment;

wherein said first and second compartments can be separately accessed so that escape of heated air from said compartments can be minimized.

2. The apparatus of claim 1 wherein said second compartment includes a plurality of shelves for supporting said individualized food portions.

3. The apparatus of claim 2 wherein said shelves each include a plurality of apertures for enabling heated air to pass therethrough.

4. The apparatus of claim 1 wherein said warming means is located upon a wall of said first compartment and includes means for heating air therein.

5. The apparatus of claim 1 wherein said conduit contains blower means for heating air therein for warming said first compartment.

6. The apparatus of claim 5 wherein said conduit contains a blower therein for circulating said air from said second compartment to said first compartment.

7. The apparatus of claim 1 wherein said first storage means is located below said second storage means.

8. The apparatus of claim 1 wherein said first compartment is larger than said second compartment.

9. The apparatus of claim 1 wherein said first compartment further comprises means for directing bulk food therein independently of said access means.

10. A food storage, display and warming apparatus comprising:

a first storage compartment for holding an amount of bulk food at a predetermined temperature above room temperature and including means for accessing said bulk food therein;

a second storage and display compartment for holding and displaying a plurality of individualized food portions and including means for viewing and accessing said individualized food portions therein;

means for heating air in said first storage compartment for warming said bulk food to said predetermined temperature;

a common wall connecting said first and second storage compartments and including means to enable heated air in said first storage compartment to pass into said second storage compartment; and a conduit for returning heated air from said second storage compartment to said first storage compartment;

wherein said first and second compartments can be separately accessed so that escape of heated air from said compartments can be minimized.

11. The apparatus of claim 10 wherein said second compartment includes a plurality of shelves for supporting said individualized food portions.

12. The apparatus of claim 11 wherein said shelves each includes a plurality of apertures for enabling heated air to pass therethrough.

13. The apparatus of claim 10 wherein said conduit contains blower means for circulating said air from said second storage compartment to said first storage compartment.

14. The apparatus of claim 13 wherein said conduit further contains means for heating air therein for warming said first compartment wherein all air in said conduit must pass through said heating means.

15. The apparatus of claim 10 wherein said first compartment is larger than said second compartment.

16. The apparatus of claim 15 wherein said first compartment further comprises means for directing bulk food therein independently of said access means.

17. The apparatus of claim 10 wherein said heating means is located upon an inner sidewall of said first compartment.

18. A food storage, display and warming apparatus comprising:

a first storage compartment for holding an amount of bulk food at a predetermined temperature above room temperature and including means for accessing said bulk food therein;

a second storage compartment located above said first storage compartment for holding and displaying a plurality of individualized food portions therein and including means for viewing and accessing said individualized food portions therein;

means for heating and directing air into said first storage compartment for warming said bulk food to said predetermined temperature;

a common wall connecting said first and second storage compartments and including means to enable heated air in said first storage compartment to pass into said second storage compartment; and a conduit for returning heated air from said second storage compartment to said first storage compartment, said heating means forming a portion of said conduit wherein all air in said conduit must pass through said heating means;

wherein said first and second compartments can be separately accessed so that escape of heated air from said compartments can be minimized.

19. The apparatus of claim 18 wherein said second compartment includes a plurality of shelves for supporting said individualized food portions.

20. The apparatus of claim 19 wherein said shelves each includes a plurality of apertures for enabling heated air to pass therethrough.

21. The apparatus of claim 18 wherein said conduit contains blower means for circulating said air from said second storage compartment to said first storage compartment.

22. The apparatus of claim 18 wherein said first and second storage means each includes means for access thereinto.

23. The apparatus of claim 18 wherein said first compartment further comprises means for heating air located upon an inner sidewall thereof.

24. The apparatus of claim 18 wherein said first compartment is larger than said second compartment.

25. The apparatus of claim 24 wherein said first compartment further comprises means for directing bulk food therein independently of said access means.

* * * * *